United States Patent [19]
Ogawa

[11] Patent Number: 5,623,710
[45] Date of Patent: Apr. 22, 1997

[54] PRESENTATION APPARATUS FOR PHOTOGRAPHIC DATA

[75] Inventor: Hidehiro Ogawa, Funabashi, Japan

[73] Assignee: Nikon Corporation, Tokyo, Japan

[21] Appl. No.: 713,191

[22] Filed: Sep. 12, 1996

Related U.S. Application Data

[63] Continuation of Ser. No. 253,288, Jun. 3, 1994, abandoned.

[30] Foreign Application Priority Data

Jun. 7, 1993 [JP] Japan ................................. 5-136234

[51] Int. Cl.⁶ .................................................. G03B 17/24
[52] U.S. Cl. ................................. 396/300; 396/310
[58] Field of Search ........................... 354/75, 76, 106, 354/289.12

[56] References Cited

U.S. PATENT DOCUMENTS

| | | | |
|---|---|---|---|
| 4,217,046 | 8/1980 | Weinstein et al. | 354/76 |
| 5,028,942 | 7/1991 | Kirigaya | 354/106 |
| 5,142,310 | 8/1992 | Taniguchi et al. | 354/106 |
| 5,289,217 | 2/1994 | Rosenblatt | 354/76 |
| 5,300,974 | 4/1994 | Stephenson, III | 354/75 |
| 5,319,401 | 6/1994 | Hicks | 354/76 |
| 5,502,830 | 3/1996 | Aihara | 395/421.07 |
| 5,557,361 | 9/1996 | Inoue et al. | 354/289.1 |

*Primary Examiner*—Safet Metjahic
*Assistant Examiner*—Daniel Chapik
*Attorney, Agent, or Firm*—Oliff & Berridge

[57] ABSTRACT

The presentation apparatus for photographic data according to the present invention includes: a presentation element which presents photographic data for each frame of a film; an input device; a setting circuit which sets frame numbers which are to be presented corresponding to the photographic data which are to be presented, in response to the operation of the input device; and a control circuit which controls the presentation element to present the set frame numbers and the photographic data corresponding to said frame numbers.

24 Claims, 12 Drawing Sheets

FIG. 3

CAMERA NAME: _____ / FILM SENSITIVITY: ISO100 / NUMBER OF FILM FRAMES: 36

| FRAME NO. | SHUTTER SPEED | APERTURE OPENING | EXPOSURE MODE | PHOTOMETRIC MODE | FOCAL LENGTH | EXPOSURE COMPENSATION AMOUNT |
|---|---|---|---|---|---|---|
| 2 | 250 | F2.8 | P | MATRIX | 200 | +0.3 |
| 3 | 125 | F4 | P | MATRIX | 200 | +0.3 |
| 4 | 60 | F8 | M | SPOT | 75 | 0.0 |
| 5 | 125 | F5.6 | S | SPOT | 135 | 0.0 |
| 6 | 30 | F1.8 | A | MATRIX | 28 | 0.0 |
| 7 | 500 | F11 | P | MATRIX | 50 | 0.0 |
| 8 | 1000 | F8 | S | SPOT | 35 | −1.0 |
| 9 | 15 | F2.8 | A | MATRIX | 60 | 0.0 |
| 10 | 250 | F4 | P | MATRIX | 100 | 0.0 |
| 11 | 125 | F2 | P | MATRIX | 80 | 0.0 |
| --- | | | | | | |
| 35 | 125 | F8 | S | SPOT | 24 | −0.7 |
| 36 | 60 | F5.6 | A | MATRIX | 35 | 0.0 |

FIG. 4

CAMERA NAME: _____ / FILM SENSITIVITY: ISO100 / NUMBER OF FILM FRAMES: 36

| 60 F8<br>M SPOT<br>75 0.0 | 125 F5.6<br>S SPOT<br>135 0.0 | 30 F1.8<br>A MATRIX<br>28 0.0 | 500 F11<br>P MATRIX<br>50 0.0 | 250 F2.8<br>P MATRIX<br>200 +0.3 | 125 F4<br>P MATRIX<br>200 +0.3 |
|---|---|---|---|---|---|
| 250 F4<br>P MATRIX<br>100 0.0 | 125 F2<br>P MATRIX<br>80 0.0 | . . . | . . . | 1000 F8<br>S SPOT<br>35 −1.0 | 15 F2.8<br>A MATRIX<br>60 0.0 |
| | | . . . | 125 F8<br>S SPOT<br>24 −0.7 | 60 F5.6<br>A MATRIX<br>35 0.0 | |

FIG.8

SET THE OFFSET

THE INITIAL FRAME NUMBER FOR DISPLAY AND/OR PRINTING

PLEASE INPUT THE NUMBER FOR THE FIRST FRAME:

SET THE OFFSET

THE POSITION FOR DISPLAY AND/OR PRINTING

PLEASE INPUT THE POSITION FOR THE FIRST FRAME:

| | | | | | |
|---|---|---|---|---|---|
| 250 F2.8 MATRIX +0.3<br>P 200 | 125 F4 MATRIX +0.3<br>P 200 | 60 F8 SPOT 0.0<br>M 75 | 125 F5.6 SPOT 0.0<br>S 135 | 30 F1.8 MATRIX 0.0<br>A 28 | 500 F11 MATRIX 0.0<br>P 50 |
| 1000 F8 SPOT -1.0<br>S 35 | 15 F2.8 MATRIX 0.0<br>A 60 | 250 F4 MATRIX 0.0<br>P 100 | 125 F2 MATRIX 0.0<br>P 80 | . . . . | 60 F5.6 MATRIX 0.0<br>A 35 |
| | | | . . . . | 125 F8 SPOT -0.7<br>S 24 | |
| | | | | . . . . | |

PRESENTATION APPARATUS FOR PHOTOGRAPHIC DATA

This is a Continuation of application Ser. No. 08/253,288 filed Jun. 3, 1994, now abandoned.

Background of the Invention

1. Field of the Invention

The present invention relates to a presentation apparatus for photographic data, which can present photographic data for each frame of a film to the operator.

2. Description of the Related Art

A presentation apparatus for photographic data has been proposed which, for example using a personal computer, presents to the operator, via a display screen or a printer or some other output means, a table of photographic data relating to each frame of a film which has been exposed in a camera, arranged according to the frame number of each frame. The photographic data may for example include shutter speed, aperture opening, exposure mode, photometric mode, focal length to which the photographic lens was adjusted, exposure compensation amount, and the like.

However, the following problems have arisen with such a prior art type of photographic data presentation apparatus.

On a typical type of camera film, the frame numbers are recorded in advance in the form of hidden images as the integers "1", "2", . . . "36" from the first frame of the film through to the last frame thereof, and when the film is developed these frame numbers are thereby made visible. However due to various reasons, for example because the length of the leader portion of the film may vary, or because the amount of initial winding on of the film performed by the camera may vary, in practice the position on the film from which exposure (i.e. photography) starts is not fixed as being the position thereon at which the integer "1" is thus recorded as a hidden image. For example it may happen that the first frame actually shot on the film falls at the position at which the integer "2" for the second frame is recorded in advance, and in this event all of the film frames shot on the film will come to be numbered with integers which are one higher than their actual serial numbers in order starting at "1".

With a prior art type of presentation apparatus like that described above, no allowance has been made for the possibility, just described, that the frame numbers recorded on the film and the actual serial numbers of the film frames which are shot may not be in agreement, and the construction and operation have been such that on the presentation the frame numbers which are appended to the photographic data necessarily start at "1". For this reason the frame numbers on the presentation and the actual frame numbers on the film do not necessarily agree, and a danger exists that confusion may arise when establishing correspondence between the photographic images on the film and the photographic data on the presentation corresponding to these images.

Summary of the Invention

The objective of the present invention is to provide a presentation apparatus for photographic data, with the use of which it is always easily possible to establish correspondence between the photographic data and the photographic images on the film, whatever be the position on the film at which photography has started.

In order to attain this objective, the present invention proposes a presentation apparatus for photographic data, comprising: a presentation means for presenting photographic data for each frame of a film; an input device; a setting means for, setting frame numbers which are to be presented corresponding to said photographic data which are to be presented, in response to the operation of said input device; and a control means for controlling said presentation means to present said set frame numbers and said photographic data which are to be presented corresponding to said frame numbers.

Since according to the operation of the present invention as described above the frame numbers appended to the photographic data which is to be presented can be set by the operation of the input device, thereby, whatever be the position on the film at which photography starts, the frame numbers appended to the data on the presentation and the frame numbers for the corresponding film frames on the film can be made to agree. Accordingly there is no danger that confusion may arise when establishing correspondence between the photographic images on the film and the photographic data which is presented.

Brief Description of the Drawings

FIG. 3 is a figure showing a presentation of an exemplary set of photographic data, as provided by the first preferred embodiment of the present invention;

FIG. 4 is a figure showing a presentation of the same exemplary set of photographic data as provided by the second preferred embodiment of the present invention;

FIG. 8 is a figure showing an input screen for the offset setting routine of FIG. 7;

FIG. 11 is a figure showing an input screen for the presentation position setting routine of FIG. 10; and:

FIG. 12 is a figure showing an example of two dimensional presentation format which is presented when the presentation position is not input.

Detailed Description of the Preferred Embodiments

The preferred embodiments of the present invention will now be explained with reference to FIGS. 1 through 10.

Figure 1:
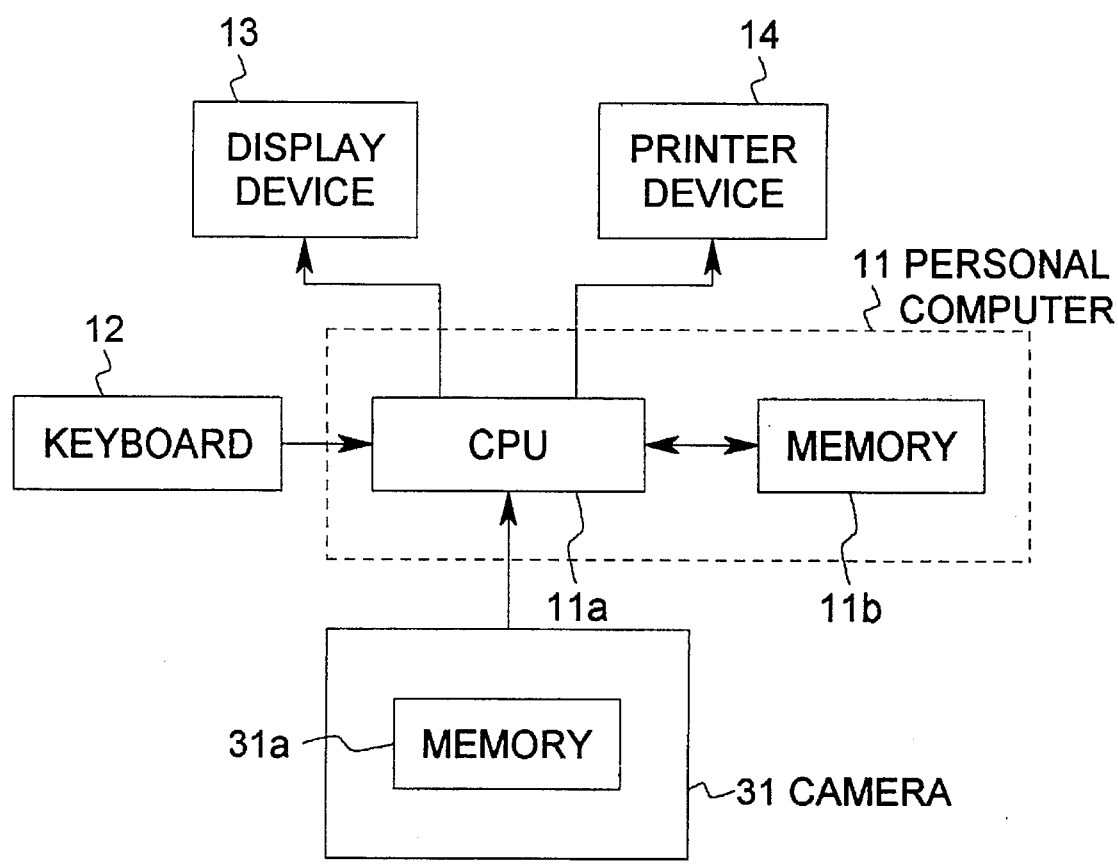
FIG. 1 is a block diagram showing the overall structure of both the preferred embodiments of the presentation apparatus for photographic data according to the present invention.

As shown in FIG. 1, all of the preferred embodiments of the presentation apparatus for photographic data according to the present invention comprise a main unit 11 which consists of a personal computer, and to this personal computer main unit 11 there are connected a keyboard 12, a display device 13, and a printer device 14. Further, a camera 31 (which does not itself constitute a part of the present invention) is shown in the figure as being connected to the personal computer main unit 11 via a cable and an appropriate interface (not particularly shown); this connection is temporary, and can be established by the operator whenever desired. A memory 31a is provided within the camera 31, and as each of the frames on a film loaded into the camera 31 is shot in succession the desired photographic data related to that frame is stored in this memory 31a. Such photographic data may be, for example, shutter speed, aperture opening, exposure mode, photometric mode, focal length of the photographic lens, exposure compensation amount, and the like.

Figure 2:
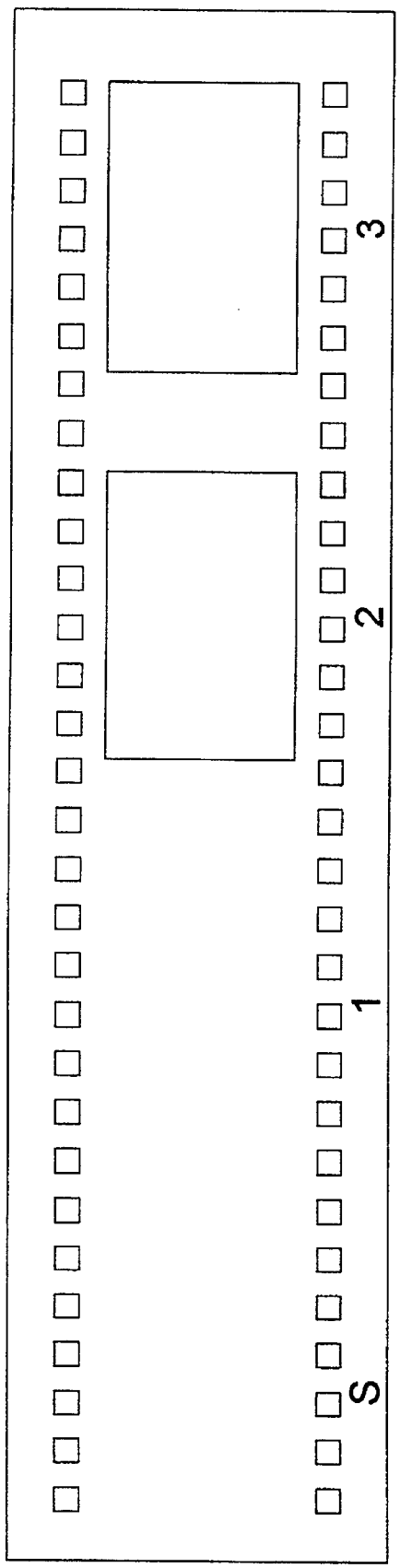
FIG. 2 is a view showing a portion of a film loaded in the camera.

FIG. 2 shows a portion of the film which is loaded into the camera 31. Along the lower edge of this film frame numbers are recorded in advance in the form of hidden images as the integers "1", "2", . . . . However, as described above, the position on the film at which exposure actually is started is not necessarily fixed as being the intended first frame position thereon at which the integer "1" is thus recorded as a hidden image. FIG. 2 shows, as an example, the case in which the exposure of frames on the film has been started at the position at which the integer "2" was recorded. Further, due to characteristic operation of the film forwarding system of the camera or due to variation in the length of the leader portion of the film, it may alternatively happen that exposure of the frames on the film may be started on the leader portion on which the character "S" is recorded, before the intended first frame position thereon at which the integer "1" is recorded.

Returning to FIG. 1, the personal computer main unit 11 comprises a CPU 11a and a memory 11b, and when the camera 31 is connected to the main unit 11 it becomes possible to input the photographic data recorded in the memory 31a of the camera 31 into the CPU 11a in order.

The display device 13, in response to display orders from the CPU 11a, displays on its screen (i.e., presents to the operator) this photographic data in a predetermined data presentation format. Similarly, the printer device 14, in response to print orders from the CPU 11a, prints out (i.e., presents to the operator) this photographic data in the predetermined data presentation format.

Examples of possible photographic data presentation formats, which are provided by the first and the second preferred embodiments of the present invention respectively, are shown in FIGS. 3 and 4. FIG. 3 shows a presentation provided by the first preferred embodiment according to a per se conventional presentation format of an exemplary set of photographic data, in which a simple serial list of the photographic data for each film frame is provided on a line by line basis, with the corresponding frame numbers appended as a leftmost column. On the other hand, FIG. 4 shows a presentation provided by the second preferred embodiment of the same exemplary set of photographic data six frames at a time, according to a two dimensional presentation format which is similar to the layout of the corresponding film frames on the cut strips of film. In more detail, when a film is sent to a processing laboratory for development it is usually cut into film strips each containing six film frames, and typically these cut film strips are slipped for storage into the pouches of a film display wallet (not particularly shown in the figures) which is made of transparent vinyl material or the like, with these pouches typically extending horizontally and being arranged in a vertical stack. Thereby the film frames are arranged in a two dimensional layout in order, and the photographic data presentation format of FIG. 4 is arranged to be similar to this two dimensional film frame layout as established by the film display wallet, so that a reliable correspondence can be promptly and easily established between any one of the film frames on the film strips and its associated photographic data, which is very convenient for reference.

Figure 5:
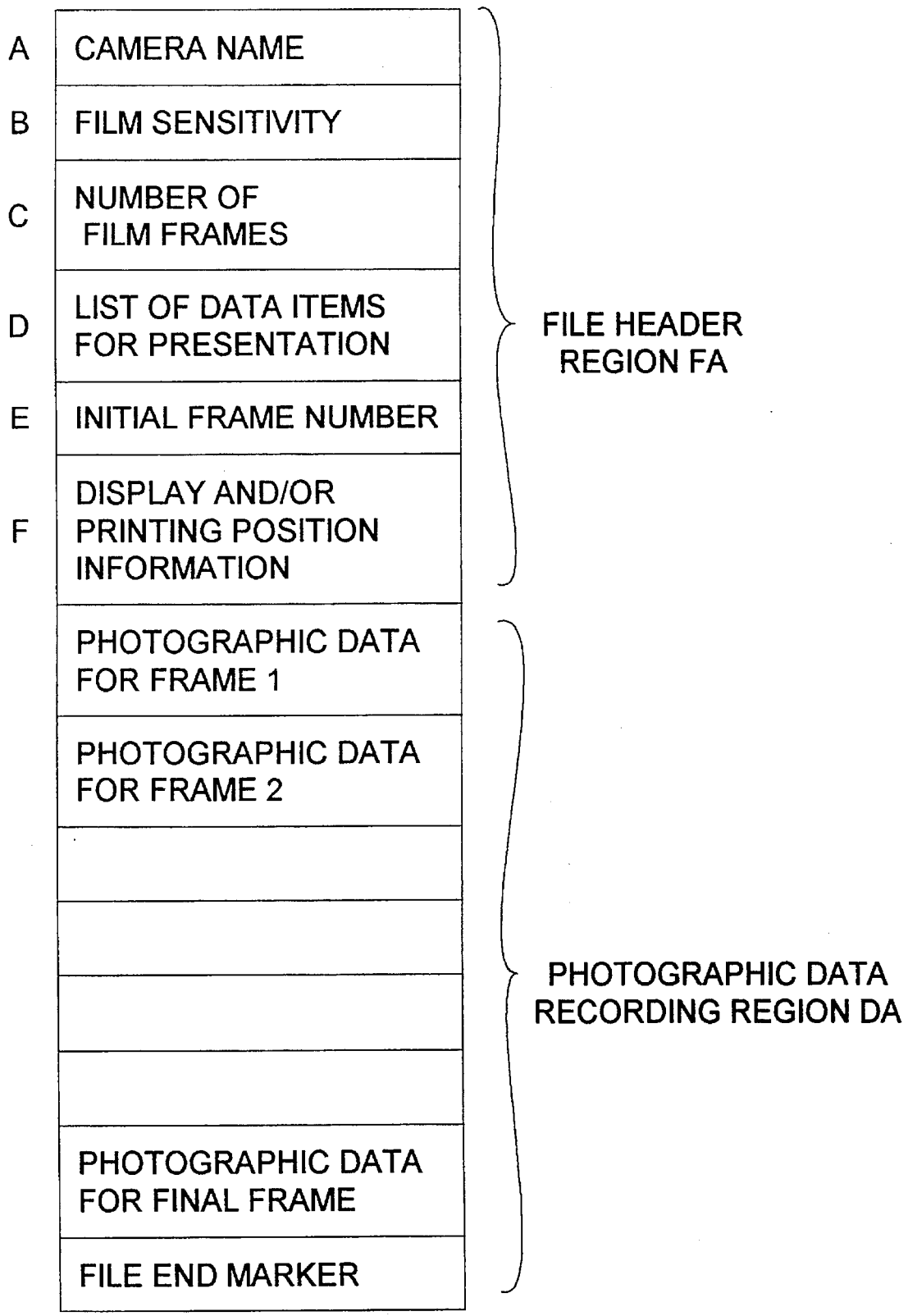
FIG. 5 is a figure for explanation of the layout of film data and photographic data in the memory 11b.

As shown in FIG. 5, which is applicable to all of the preferred embodiments, the memory 11b in the personal computer main unit 11 has a file header region FA and a photographic data recording region DA, and the file header region FA is further subdivided into six regions denoted by A through F. The region A is a region for recording the name of the camera which was used for shooting the film in question; the region B is a region for recording the sensitivity of the film; the region C is a region for recording the number of frames shot on the film; the region D is a region for recording a list of the items of photographic data to be displayed; the region E is a region for recording the leading frame number (the initial frame number value); and the region F is a region for recording the starting display or printing position for the film display wallet oriented presentation format of FIG. 4. The value "1" is written in advance in the regions D and F as an initial value.

On the other hand, the photographic data which is input from the memory 31a of the camera 31 is stored in the photographic data recording region DA in order from the first film frame through to the last film frame. Here the terms "first film frame", "second film frame", etc. are only used for denoting the various frames on the film by the order in which they were shot and in which they lie upon the surface of the film, and as explained earlier these terms do not necessarily correspond to the so called frame numbers which are printed on the edge of the film as shown in FIG. 2.

The operation of the preferred embodiments of the present invention will now be described with reference to FIGS. 6 through 11.

Embodiment 1: Conventional Presentation Format

Figure 6:
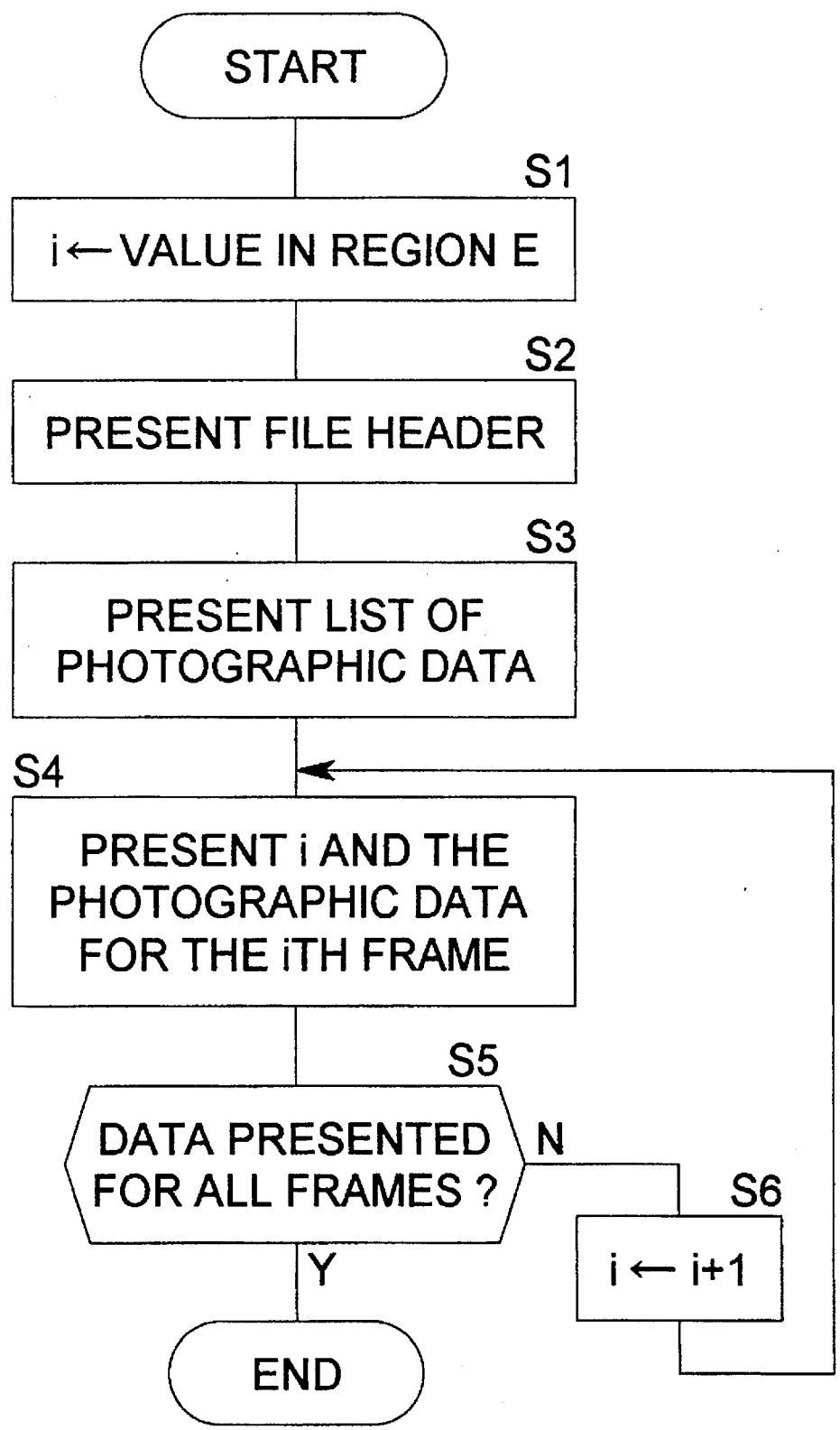
FIG. 6 is a flow chart showing the operation of a presentation routine in the first preferred embodiment of the present invention.
Figure 7:
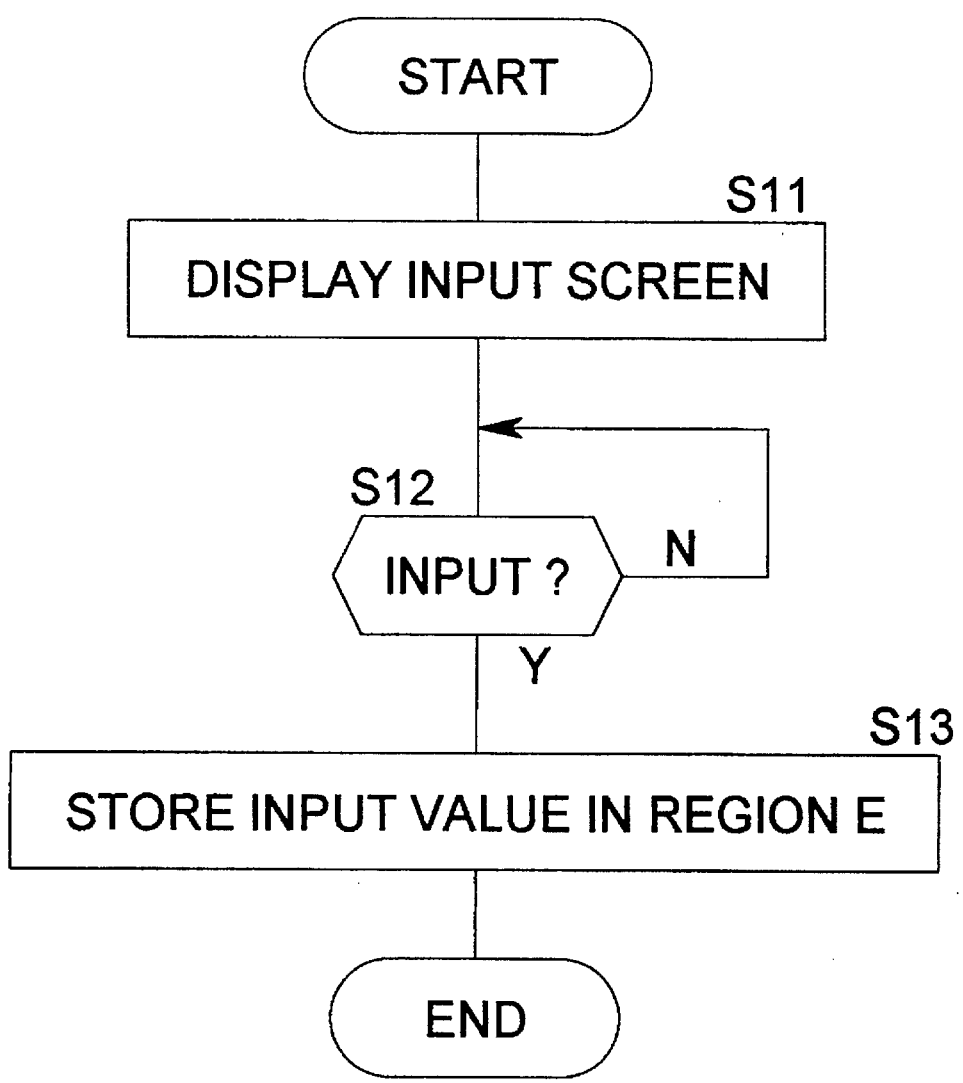
FIG. 7 is a flow chart showing the operation of an offset setting routine in this first preferred embodiment.

FIGS. 6 and 7 are flow charts showing the procedure followed by the CPU 11a incorporated in the first preferred embodiment of the present invention for presenting photographic data according to the per se conventional presentation format of FIG. 3.

After the operator has connected the camera 31 to the personal computer main unit 11, he utilizes the keyboard 12 to initiate the data reading in procedure, and the photographic data which are stored in the memory 31a of the camera 31 are copied over into the CPU 11a of the personal computer main unit 11 and are then stored in the photographic data recording region DA of its memory 11b as shown in FIG. 5. Further, the operator inputs via the keyboard 12 the camera name, the film sensitivity, the number of film frames, and the list of items of photographic data to be displayed, and these data items are stored in the regions A through D of the file header region FA of the memory 11b, as also shown in FIG. 5. In this state the operator looks at the film which has been developed, and if he determines that photography actually did start from the position on the film at which the frame number "1" was recorded in advance, i.e. that the frame numbers on the film and the actual numbers of the film frames in the serial order in which they were shot do actually agree, then he initiates the presentation procedure via the keyboard 12. This starts the operation of the data presentation routine whose flow chart is shown in FIG. 6.

Referring to FIG. 6, in the step S1 the data value stored in the region E of the memory 11b, which represents the frame number of the first frame on the film, is read out, and this value is stored as the initial value of a count variable i. By doing this, the frame number is set for the photographic data which should be presented first. In the step 2 the camera name, the film sensitivity, and the number of film frames, which are respectively stored in the regions A, B and C of the memory 11b, are presented in predetermined positions, for example by being displayed on the screen of the display device 13 (this operation is termed file header presentation). In the step S3, a list of the elements of photographic data which are to be presented, prefixed by the frame number, is displayed upon the screen of the display device 13; this information is obtained from the region D of the memory 11b. In the shown example, the elements of photographic data which are to be presented are shutter speed, aperture opening, exposure mode, photometric mode, focal length, and exposure compensation amount.

In the step S4 the value of the above described variable i is presented in the position on the next free line corresponding to and below "frame number", and also the various photographic data items for the ith frame on the film are presented in positions on the same line corresponding to and below the list of photographic data elements which was presented in the step 3. In the step S5, a decision is made as to whether or not the data for all the frames on the film has been presented, and if the result is YES then processing terminates. If the decision result in the step 5 is NO, then the flow of control passes to the step S6, in which the above described variable i is incremented by one so as to set the next frame number, and then the flow of control loops back to the step 4 again, so that the above described processing is repeated for the next film frame and for the set of photographic data items corresponding thereto.

Thus, according to the procedure shown in FIG. 6, the photographic data for all of the film frames is presented by being displayed on the screen of the display device 13 along with the corresponding frame number in order.

On the other hand if, when the operator looks at the film which has been developed, he determines that photography in fact did not start from the position on the film at which the frame number "1" was recorded in advance, i.e. that the frame numbers on the film and the actual numbers of the film frames in the serial order in which they were shot actually do not agree, then via the keyboard 12 he performs the operation of setting an offset. This causes the operation of the frame number offset setting routine whose flow chart is shown in FIG. 7 to be initiated; and after the operation of this FIG. 7 routine is concluded the operation of the FIG. 6 presentation routine, described above, is initiated.

Referring to FIG. 7, in the step S11 an input screen, exemplarily the input screen shown in FIG. 8, is displayed upon the screen of the display device 13. This screen is for inviting input of the frame number that should be appended to the first set of photographic data presented, i.e. the frame number offset, and the step S12 loops, so as to wait for this input. The range of allowable values is from −2 to 40. The procedure is that the operator looks at the developed film strip, finds the first frame actually shot on it, identifies the frame number on the edge of the film corresponding to that actual first frame, and then inputs this number for the first frame via the keyboard 12. For example, in the case of the film strip shown in FIG. 2, photography has started at the position at which the frame number "2" is recorded on the film edge, so the operator inputs the value "2"; or, as another example, if photography has started at the position on the film where the symbol "S" is recorded, i.e. before the frame number "1", then the operator inputs the value "0".

Because the upper limit for input of the numerical value for the frame number offset is 40, this presentation apparatus for photographic data according to the first preferred embodiment of the present invention is capable of handling even extra long films. Normally, a connected sequence of consecutive frame numbers is not recorded on such extra long films from their first frame to their last frame, but rather a sequence of frame numbers from 1 to about 40 is repeatedly recorded on them; and thus, with such an extra long film, the frame number offset range from 1 to 40 is sufficient to ensure that it is possible to find a number which corresponds to the frame number at which photography starts, whatever it may be.

When in the step S12 it is determined that a numerical value has been input, then the flow of control is transferred to the step S13, and the numerical value which has been input is stored in the region E of the memory 11b, which was initially set to the value "1" which is now overwritten by this input numerical value.

After this the operation of the FIG. 6 presentation routine is initiated, and as described above a summary presentation of the photographic information is provided.

In this manner, with this first preferred embodiment, the frame number corresponding to the first set of photographic data which is to be presented can be manually set by the user, and therefore it is possible for the user to ensure that the frame number appended upon the presentation to the first set of photographic data presented will agree with the frame number recorded on the side of the film beside the first frame thereon, whatever may be the position on the film from which photography has commenced. That is, if for example as shown in FIG. 2 photography on the film has started from the position opposite the recorded frame number "2", by the user inputting the frame number "2" as an offset, the frame number appended upon the presentation to the first set of photographic data will be "2"; or, if for example photography on the film has started from the so called zeroth frame thereon which is opposite the edge position at which the symbol "S" is recorded, by the user inputting the frame number "0" as an offset, the frame number appended upon the presentation to the first set of photographic data will be "0". Further, if photography on the film has started even before this so called zeroth frame thereon, by the user inputting the frame number "−1" or "−2" as an offset, as appropriate, the frame number appended upon the presentation to the first set of photographic data will be "−1" or "−2".

Further, provided that the correct frame number is thus set for the first set of photographic data to be presented, it will be automatically ensured that the frame numbers appended to the presentations of the second and subsequent sets of photographic data will agree with the actual frame numbers recorded on the edge of the film opposite the corresponding second and subsequent frames thereon. Accordingly, the frame numbers appended to the presentations of all of the sets of photographic data will agree with the actual frame numbers recorded beside the corresponding film frames.

Although in the above description it has been assumed that the presentation to the user of the photographic data and of the frame numbers thereof is being performed via the medium of the display device 13, this is only by way of example, and is not to be considered as limitative of the present invention, since by following a similar procedure such presentation could be performed via the printer 14 or via some other means.

Embodiment 2: Film Display Wallet Oriented Presentation Format

Figure 9:
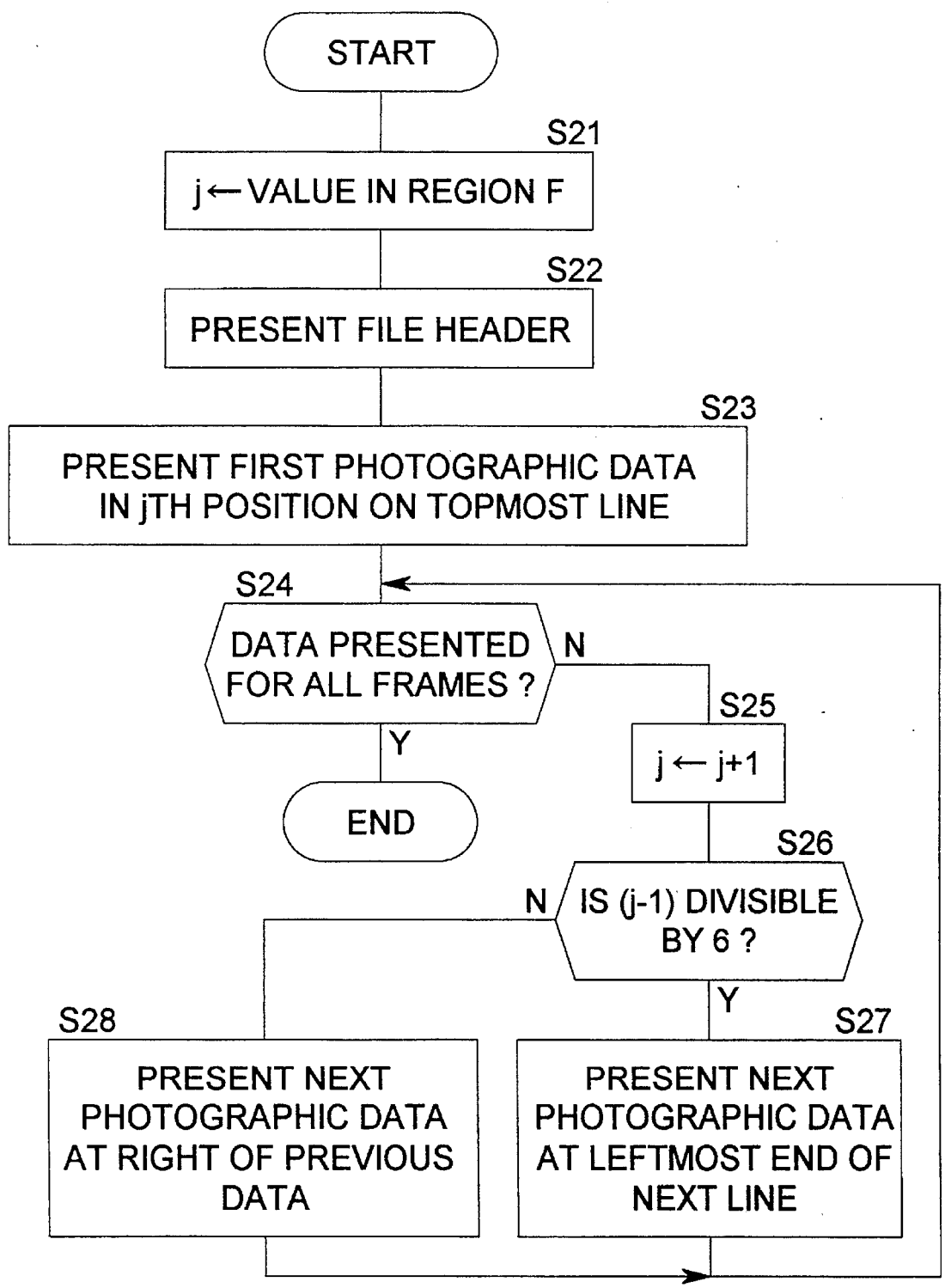
FIG. 9 is a flow chart showing the operation of a presentation routine in the second preferred embodiment of the present invention.
Figure 10:
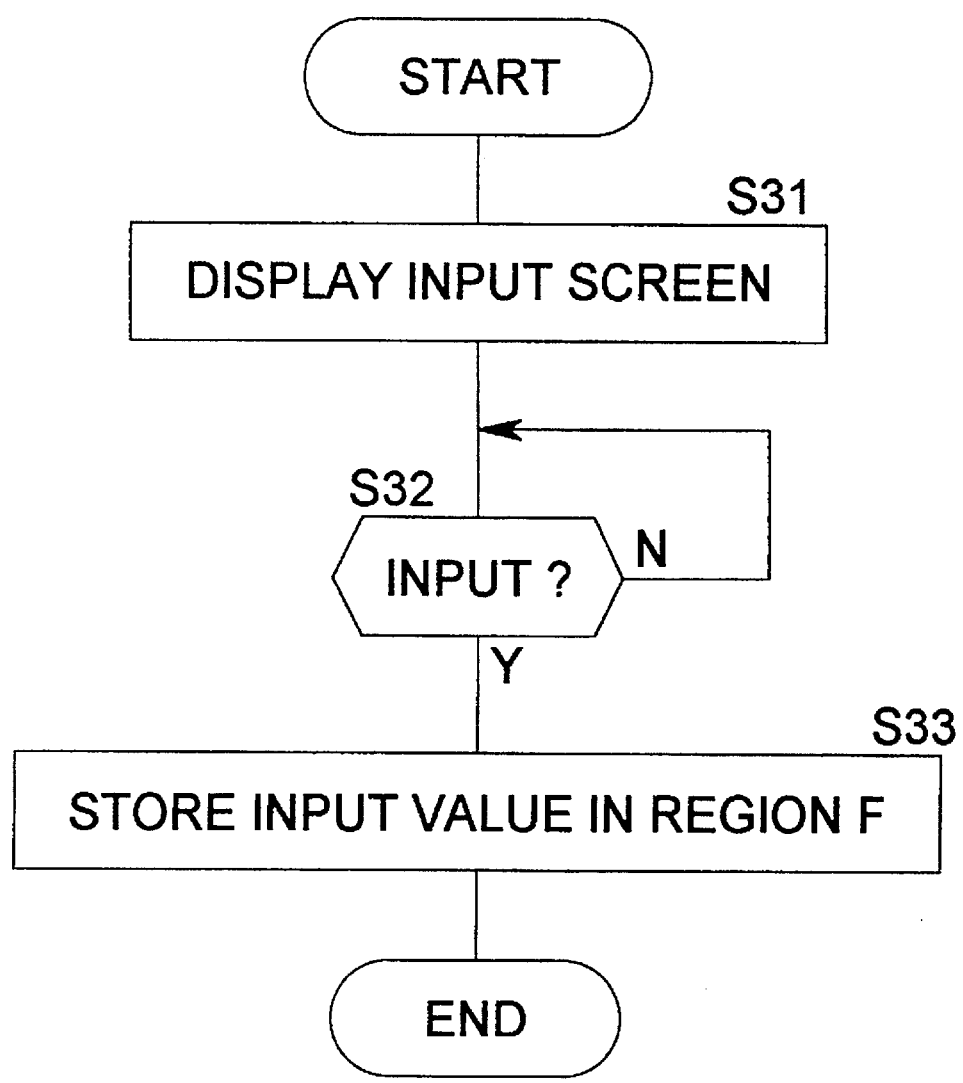
FIG. 10 is a flow chart showing the operation of a presentation position setting routine for this second preferred embodiment.

FIGS. 9 and 10 are flow charts showing the procedure followed by the CPU 11a incorporated in the second preferred embodiment of the present invention for presenting photographic data according to the film display wallet oriented presentation format of FIG. 4.

As before, the operator connects the camera 31 to the personal computer main unit 11 and initiates the data reading in procedure, so that the photographic data are copied over from the memory 31a of the camera 31 into the CPU 11a of the main unit 11 and are then as before stored in the region DA of its memory 11b as shown in FIG. 5. Further, the operator inputs via the keyboard 12 the camera name, the film sensitivity, the number of film frames, and the list of items of photographic data to be displayed, and as before these data items are stored in the regions A through D of the region FA of the memory 11b. In this state the operator looks at the film which has been developed, and if he determines that photography actually did start from the position on the film at which the frame number "1" was recorded in advance, i.e. that the frame numbers on the film and the actual numbers of the film frames in the serial order in which they were shot do actually agree, then he initiates the film display wallet oriented presentation procedure via the keyboard 12. This starts the operation of the data presentation routine whose flow chart is shown in FIG. 9.

Referring to FIG. 9, in the step 21 the data value stored in the region F of the memory 11b, which represents the position at which presentation should commence, is read out, and this value is stored as the initial value of a count variable j. In the step S22, the identical operation of file header presentation as was explained for the step S2 of the FIG. 6 flow chart is performed. In the step S23, the various photographic data items for the first frame on the film are presented upon the display device 13 on the topmost line of a previously determined presentation field in the jth region from the left (refer to FIG. 4 and FIG. 12).

In the step 24, a decision is made as to whether or not the data for all the frames on the film has been presented, and if the result is YES then processing terminates. If the decision result in the step S24 is NO, then the flow of control passes to the step S25, in which the above described variable j is incremented by one, and then control passes to the step S26, in which a decision is made as to whether or not the value ( j–1) (i.e. the previous value of j ) is divisible by 6. If it is determined that the value (j–1) is divisible by 6, then the flow of control passes to the step S27, in which the various photographic data items for the next frame on the film are presented upon the display device 13 in the first region from the left on the next line of the presentation field. On the other hand, if it is determined that the value (j–1) is not divisible by 6, then the flow of control passes to the step S28, in which the various photographic data items for the next frame on the film are presented upon the display device 13 on the current line of the presentation field in the next region to the right of the one used in the previous time around this program loop. After either of these steps 27 and 28 the flow of control loops back to the step S24 again, so that the above described processing is repeated for the next film frame and for the set of photographic data items corresponding thereto.

Thus, according to the procedure shown in FIG. 9, the photographic data for all of the film frames is presented by being displayed on the screen of the display device 13 in order in a format as shown in FIG. 12, which would correspond to the cut sheets of film frames (with six frames on each cut sheet), assuming that the first strip contained a full six frames.

On the other hand if, when the operator looks at the film which has been developed, he determines that photography in fact did not start from the position on the film at which the frame number "1" was recorded in advance, i.e. that the frame numbers on the film and the actual numbers of the film frames in the serial order in which they were shot actually do not agree, then via the keyboard 12 he performs the operation of setting an offset. This causes the operation of the frame number offset setting routine whose flow chart is shown in FIG. 10 to be initiated; and after the operation of this FIG. 10 routine is concluded the operation of the FIG. 9 presentation routine, described above, is initiated.

Referring to FIG. 10, in the step S31 an input screen, exemplarily the input screen shown in FIG. 11, is displayed upon the screen of the display device 13. This screen is for inviting input of the display position for the first set of photographic data presented, and the step S32 loops so as to wait for the input of this numerical value. It is assumed that, if this display format is being used, the film has been cut up by the processing laboratory after development into film strips each containing six film frames, and that these cut film strips have been slipped for storage into the pouches of a film display wallet made of transparent material, with these pouches extending horizontally and being arranged in a vertical stack, so that the film frames are arranged in a two dimensional layout in order. However, the first frame on the film does not always fall at the left end of the first such film strip, but may be positioned some way along this first strip. Therefore, the procedure is that the operator looks at the first film strip in the display wallet (the topmost in the two dimensional layout provided by the wallet), identifies in which of the six available positions from the left end to the right end of this film strip the first frame actually shot on it lies, and then inputs a corresponding integer via the keyboard 12. Thus, the range of allowable values is from 1 to 6. For example, if the operator sees that the first frame lies in the fifth possible position from the left on the first film strip, then he inputs the value "5".

When it is determined in the step S32 that a numerical value has been input, then the flow of control is transferred to the step 33, and the numerical value which has been input is stored in the region F of the memory 11b, which was initially set to the value "1" which is now overwritten by this input numerical value.

After this the operation of the FIG. 9 presentation routine is initiated, and as described above a summary presentation of the photographic information is provided in a format corresponding to that of the two dimensional layout of the film strips provided by the display wallet.

In this manner, with this second preferred embodiment, the presentation position for the first set of photographic data which is to be presented can be manually set by the user, and therefore it is possible for the user to ensure that this presentation position for the first set of photographic data presented will agree with the position of the first frame on the film strip layout provided by the display wallet, whatever may be the position on the film from which photography has commenced. That is, if for example the first film frame on the first film strip lies in the fifth available position from the left end thereof, then, by the operator inputting the value "5" as an offset, the first set of photographic data presented will be positioned as shown in FIG. 4 in the fifth region from the left end of the first line of the presentation.

Further, provided that the correct presentation position is thus set for the first set of photographic data to be presented, since thereby the presentation positions for the second and subsequent sets of photographic data are also automatically set, thereby it is ensured that these presentation positions for the second and subsequent sets of photographic data will all agree with the positions of the corresponding frames on the film strip layout provided by the display wallet.

Now, FIG. 12 has been shown by way of example, and in this case the presentation position of the first set of photographic data is always at the left end of the first line of the presentation, and is not related to the position of the first film frame in the film strip layout provided by the display wallet. In this case, the arrangement of the photographic data on the presentation and the layout of the film frames provided by the display wallet are different, so that when the photographer is attempting to establish correspondence between the film frames and the corresponding photographic data there is a grave danger of confusion occurring.

Although in the above description it has been assumed that the presentation to the user of the photographic data in the arrangement described is being performed via the medium of the display device 13, this is only by way of example, and is not to be considered as limitative of the present invention, since by following a similar procedure such presentation could be performed via the printer 14 or via some other means.

Now, this method of setting the presentation position based upon a value input by the operator as explained above is also applicable to the normal type of presentation format. For example, there would also be another possible variation in that in the format shown in FIG. 3, consecutive frame numbers starting at "1" are always presented in the position designated in successive lines by "Frame No.", and, if for example the operator has input the number "2" as an offset, no photographic data is presented in the first line in which "1" appears, and the first set of photographic data comes to be presented in the next line in which "2" appears, and so on.

Further, although it was specified that in the above described presentation processing for the normal type of presentation format the frame number was input, it is also possible, as an alternative, for the construction to be such that relative frame number to "1" is input. For example, it will be effective to perform the control process in such a manner that, if photography in fact starts on the film from the second frame thereof, by inputting "1" which is the relative frame number to "1", the frame number appended to the first set of photographic data which is presented will be caused to be "2", in the same manner as described above. Yet further, it will also be possible, in the above described presentation processing for the film display wallet type of presentation format, to input a relative presentation position from the left end of the topmost line of the presentation.

Moreover, with the normal type of presentation format, it also will be acceptable that at first, consecutive frame numbers starting from "1" are always presented and afterward, all of the frame numbers on the presentation are increased by "1" each every time some incrementing action for the frame numbers is performed, also all of the frame numbers on the presentation are decreased by "1" each every time some decrementing action for the frame numbers is performed. In the same manner, with the film display wallet type of presentation format, it also will be acceptable that at first, the photographic data are always presented in order from the leftmost end of the topmost line, and afterward all of the photographic data are displaced forwards by 1 region every time a predetermined displacement operation is performed.

Further, although in the above the presentation apparatus for photographic data according to the present invention has been explained under the assumption that it has been realized by the use of a personal computer, it would also be acceptable to use some device other than a personal computer, such as electronic pocketbook. Or it would also be possible for the camera itself to have a data presentation function. Or, again, a construction would be practicable in which the photographic data stored within the camera was temporarily stored on a storing medium such as a floppy disk, and then subsequently the photographic data was loaded from this recording medium so as to be presented. Yet further, the presentation format is not to be considered as being limited to the FIG. 3 format or the FIG. 4 format. And, again, although the above explanation has related to a device with which the presentation of the photographic data could be performed both via screen display action performed by the display device 13 and also via printing action performed by the printer 14, a device in which only one or the other of these presentation means was available would also fall within the ambit of the present invention.

And, yet again, although the above explanation has assumed the case in which photographs are taken in order from the leading end of the film to its trailing end, the present invention is also applicable to a film used for photography with a camera of the so called prewind type, on which photographs are taken in the reverse order, i.e. from the trailing end of the film to its leading end. In this case, when the presentation is to be made in order starting with the photographic data for the frame at the trailing end of the film, the frame number for the frame at the leading end of the film is input for example via the keyboard, and it will be effective to make the presentation in order from this leading end frame by decrementing the frame numbers by "1" at a time.

I claim:

1. A presentation apparatus for photographic data, comprising:

a presentation means for presenting photographic data for each of multiple photographic frames of film;

an input operating member which is manually operated to input frame numbers a setting means for setting frame numbers which are to be presented corresponding to said photographic data which are to be presented based upon said input frame numbers input by said input operating member; and a control means for controlling said presentation means to present said photographic data for said photographic frames with said set frame numbers.

2. A presentation apparatus for photographic data according to claim 1, further comprising a storing device in which said photographic data for each film frame is stored, wherein said control means presents the frame numbers set by said setting means for each frame and the photographic data stored in said storing device such that both each of the frame numbers and each of the photographic data are continuously and correspondingly presented.

3. A presentation apparatus for photographic data according to claim 1, wherein said setting means sets the frame number corresponding to said photographic data which is the first to be presented by said presentation means based upon information input by operation of said input operating member, and sets the frame numbers corresponding to the second and subsequent photographic data which are to be presented, based upon the set frame number corresponding to said photographic data which is the first to be presented.

4. A presentation apparatus for photographic data according to claim 3, wherein said presentation means is a display device which displays photographic data upon a screen.

5. A presentation apparatus for photographic data according to claim 4, wherein said display device displays a frame number input display which prompts the operator to input information on said input device related to frame numbers on said film; and said setting means sets the frame number corresponding to the first photographic data which is to be displayed on said screen to said frame number related information which is input.

6. A presentation apparatus for photographic data according to claim 5, wherein said setting means sets the frame number corresponding to the first photographic data which is to be presented on said screen to "1" when no frame number is input.

7. A presentation apparatus for photographic data according to claim 3, wherein said presentation means is a printer device which prints photographic data.

8. A presentation apparatus for photographic data according to claim 7, further comprising a display device which displays input information upon a screen, said display device displays a frame number input display which prompts the operator to input information on said input device related to frame numbers on said film; and said setting means sets the frame number corresponding to the first photographic data which is to be printed to said frame number related information which is input.

9. A presentation apparatus for photographic data according to claim 8, wherein, when printing operation is done via said input operating member without frame number input operation having done, said setting means sets the frame number corresponding to the first photographic data which is to be printed to "1".

10. A presentation apparatus for photographic data, comprising:

an input device;

a display device which displays photographic data for each frame of a film upon a screen, and which, when frame number input operation via said input device is done, displays a frame number input display which prompts the operator to input information related to frame numbers on said film;

a setting means for, (1) if film frame number related information is input via said input device when said frame number input display is displayed on said screen, setting the frame number corresponding to the first photographic data which is to be displayed on said screen, based upon said frame number related information which is input; for, if display operation is done via said input device without frame number input operation having done, setting the frame number corresponding to the first photographic data which is to be displayed on said screen to "1"; and (2) setting the frame numbers corresponding to the second and subsequent photographic data which are to be displayed on said screen, based upon the set frame number corresponding to said photographic data which is the first to be displayed on said screen;

a storing device in which said photographic data for each film frame is stored; and a control means for controlling said display device to display continuously and correspondingly the frame numbers set by said setting means for each frame and the photographic data stored in said storing device.

11. A presentation apparatus for photographic data, comprising:

a presentation means for presenting photographic data for each of multiple photographic frames of film;

an input operating member which is manually operated to input information which indicates presentation positions of said photographic data;

a setting means for setting said presentation positions for said photographic data which are to be presented, based upon information input by said input operating member, so as to present said photographic data in a previously set fixed presentation format; and a control means for controlling said presentation means so as to present said photographic data which are to be presented in said presentation positions set by said setting means.

12. A presentation apparatus for photographic data according to claim 11, wherein said setting means sets the presentation positions for said photographic data so that said photographic data are presented in a presentation format which corresponds to the arrangement of the corresponding film frames when the film is stored in the pouches of a film display wallet.

13. A presentation apparatus for photographic data according to claim 11, further comprising a storing device which stores said photographic data for each film frame, wherein said control means controls said presentation means to present the photographic data stored in said storing device in sequence in the presentation positions set by said setting means.

14. A presentation apparatus for photographic data according to claim 11, wherein said setting means sets the presentation position for said photographic data which is the first to be presented by said presentation means based upon information input by operation of said input operating member, and sets the presentation positions corresponding to the second and subsequent photographic data which are to be presented, based upon the set presentation position corresponding to said photographic data which is the first to be presented.

15. A presentation apparatus for photographic data according to claim 14, wherein said presentation means is a display device which presents photographic data upon a screen.

16. A presentation apparatus for photographic data according to claim 15, wherein said photographic data is a display position input display and an operator inputs information on said input device related to said photographic data display position; and said setting device sets the display position for the first photographic data which is to be displayed on said screen corresponding to said photographic data display position which is input by said operator.

17. A presentation apparatus for photographic data according to claim 16, wherein, said setting means sets the display position for the first photographic data which is to be displayed on said screen, to a predetermined position.

18. A presentation apparatus for photographic data according to claim 14, wherein said presentation means is a printer device which prints photographic data.

19. A presentation apparatus for photographic data according to claim 18, further comprising a display device which displays input information upon a screen, said display device displays a print position input display which prompts the operator to input information on said input operating member related to photographic data print position; and said setting device sets the print position for the first photographic data which is to be printed to said photographic data print position related information which is input.

20. A presentation apparatus for photographic data according to claim 19, wherein when no position information is input by said operating member, said setting means sets the print position for the first photographic data which is to be printed, to a predetermined position.

21. A presentation apparatus for photographic data, comprising:

an input device;

a display device which displays photographic data for each frame of a film upon a screen, and which, when display position input operation via said input device is done, displays a display position input display which prompts the operator to input information related to photographic data display position;

a setting means for, (1) if photographic data display position related information is input via said input device when said display position input display is displayed on said screen, setting the display position corresponding to the first photographic data which is to be displayed on said screen, based upon said display position related information which is input; and for, if display operation is done via said input device without display position input operation having done, setting the display position corresponding to the first photographic data which is to be displayed on said screen, to a predetermined position; and (2) setting the display positions corresponding to the second and subsequent photographic data which are to be displayed on said screen, based upon the thus set display position corresponding to said photographic data which is the first to be displayed on said screen;

a storing device which stores said photographic data for each film frame; and a control means for controlling said display device to display the photographic data stored in said storing in the display positions set by said setting means.

22. A presentation apparatus for photographic data according to claim 21, wherein said setting means sets the display positions for said photographic data in a display format which corresponds to the arrangement of the corresponding film frames when the film is stored in the pouches of a film display wallet.

23. A presentation apparatus for photographic data, comprising:

a presentation element which presents photographic data for each frame of a film;

an input device which is manually operated to input frame numbers;

a setting circuit which sets frame numbers which are to be presented corresponding to said photographic data which are to be presented based upon said input frame numbers, in response to the operation of said input device; and a control circuit which controls said presentation means to present said set frame numbers and said photographic data corresponding to said set frame numbers.

24. A presentation apparatus for photographic data, comprising:

a presentation element which presents photographic data for each frame of a film;

an input device which is manually operated to input information which indicates the presentation positions of said photographic data;

a setting circuit which sets the presentation positions for said photographic data which are to be presented, based upon said information which is input, so as to present said photographic data in a previously set fixed presentation format; and a control circuit which controls said presentation means so as to present said photographic data which are to be presented in said presentation positions set by said setting circuit.

* * * * *